United States Patent
Yucra Rodriguez et al.

(10) Patent No.: US 12,282,907 B2
(45) Date of Patent: *Apr. 22, 2025

(54) OFFLOADING A SIGNING OPERATION ON A USER DEVICE

(71) Applicant: Capital One Services, LLC, McLean, VA (US)

(72) Inventors: Jonatan Yucra Rodriguez, Allentown, PA (US); Sahil Verma, San Francisco, CA (US); Jonathan Guan, Cupertino, CA (US); Jennifer Chu, Morgan Hill, CA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/540,208

(22) Filed: Dec. 14, 2023

(65) Prior Publication Data

US 2024/0112166 A1    Apr. 4, 2024

Related U.S. Application Data

(63) Continuation of application No. 17/247,982, filed on Jan. 4, 2021, now Pat. No. 11,893,562.

(51) Int. Cl.
    *G06Q 20/20*    (2012.01)
    *G06Q 20/38*    (2012.01)

(52) U.S. Cl.
    CPC ....... *G06Q 20/206* (2013.01); *G06Q 20/3825* (2013.01)

(58) Field of Classification Search
    CPC ............. G06Q 20/206; G06Q 20/3825; G06Q 20/3224; G06Q 20/3276; G06Q 20/3278;
    (Continued)

(56) References Cited

U.S. PATENT DOCUMENTS 10,115,083 B1 * 10/2018 Koeppel .............. G06Q 20/209
10,482,433 B1 * 11/2019 Myren ............... G06Q 20/0457
(Continued)

FOREIGN PATENT DOCUMENTS

KR    20110138661 A    12/2011

OTHER PUBLICATIONS

International Search Report and Written Opinion for Application No. PCT/US2021/072978, mailed on Mar. 28, 2022, 10 pages.

*Primary Examiner* — Michael Jared Walker
(74) *Attorney, Agent, or Firm* — Harrity & Harrity, LLP

(57) ABSTRACT

In some implementations, a terminal device may obtain exchange information associated with an exchange initiated at the terminal device. The exchange information may identify a medium used in the exchange. The terminal device may be configured to present a terminal-side user interface for performing a signing operation of the exchange. The terminal device may selectively obtain user information associated with the medium used in the exchange. The user information may identify a user device associated with the medium. The terminal device may transmit, to the user device and based on obtaining the user information, presentation information that identifies content for a user-side user interface for performing the signing operation at the user device. The terminal device may receive, from the user device, signing information associated with a performance of the signing operation at the user device via the user-side user interface.

20 Claims, 9 Drawing Sheets

(58) Field of Classification Search
CPC .... G06Q 20/34; G06Q 20/401; G06Q 20/409; G06Q 20/327
See application file for complete search history.

(56) References Cited

U.S. PATENT DOCUMENTS

| | | | | |
|---|---|---|---|---|
| 11,403,615 | B2* | 8/2022 | Laracey | G06Q 20/405 |
| 2012/0233005 | A1* | 9/2012 | White | G06Q 20/3672 |
| | | | | 705/18 |
| 2014/0164237 | A1* | 6/2014 | Blanco | G06Q 20/202 |
| | | | | 705/44 |
| 2015/0348004 | A1* | 12/2015 | Eramian | G06Q 20/102 |
| | | | | 705/40 |
| 2016/0104155 | A1* | 4/2016 | McGaugh | G06Q 20/405 |
| | | | | 705/65 |
| 2016/0267458 | A1* | 9/2016 | Metral | G06Q 20/20 |
| 2018/0012221 | A1* | 1/2018 | Crofts | G06Q 20/401 |
| 2018/0039965 | A1* | 2/2018 | Han | G06F 9/451 |
| 2018/0293573 | A1* | 10/2018 | Ortiz | G06Q 30/0229 |
| 2019/0122185 | A1* | 4/2019 | Koeppel | G06Q 20/425 |
| 2019/0220866 | A1* | 7/2019 | Starr | G06Q 20/3278 |
| 2020/0082379 | A1* | 3/2020 | Sharma | G07F 19/207 |
| 2020/0342423 | A1* | 10/2020 | Myren | G06Q 30/04 |
| 2020/0380514 | A1* | 12/2020 | Crofts | G06Q 20/401 |
| 2021/0065167 | A1* | 3/2021 | Rafferty | G06Q 20/389 |
| 2021/0142314 | A1* | 5/2021 | Pharr | G06Q 20/1085 |
| 2022/0215370 | A1* | 7/2022 | Yucra Rodriguez | G06Q 20/3825 |

* cited by examiner

OFFLOADING A SIGNING OPERATION ON A USER DEVICE

RELATED APPLICATION

This application is a continuation of U.S. patent application Ser. No. 17/247,982, filed Jan. 4, 2021, which is incorporated herein by reference in its entirety.

BACKGROUND

Transaction terminals, such as point of sale (POS) devices, include hardware and software components that facilitate completion of retail transactions for goods and services. Merchants may calculate an amount owed by a customer and present an itemized receipt to the customer for payment. The customer may use the POS device to make the payment to the merchant in exchange for the goods or services, as well as provide a signature or other user input.

SUMMARY

In some implementations, a non-transitory computer-readable medium storing a set of instructions for offloading a signing operation on a user device includes one or more instructions that, when executed by one or more processors of a terminal device, cause the terminal device to: obtain exchange information associated with an exchange initiated at the terminal device, where the exchange information identifies a medium used in the exchange, and where the terminal device is configured to present a terminal-side user interface for performing the signing operation of the exchange; selectively obtain user information associated with the medium used in the exchange, where the user information identifies the user device associated with the medium; transmit, to the user device and based on obtaining the user information, presentation information that identifies content for a user-side user interface for performing the signing operation at the user device; and receive, from the user device, signing information associated with a performance of the signing operation at the user device via the user-side user interface.

In some implementations, a system for offloading an operation on a user device includes one or more memories, and one or more processors, communicatively coupled to the one or more memories, configured to: receive, from a terminal device, a request associated with an exchange initiated at the terminal device, where the request identifies a medium used in the exchange, and where the terminal device is configured to present a terminal-side user interface for performing the operation of the exchange; obtain user information associated with the medium used in the exchange, where the user information identifies the user device associated with the medium; transmit, to the user device and based on obtaining the user information, presentation information that identifies content for a user-side user interface for performing the operation at the user device; receive, from the user device, operation information associated with a performance of the operation at the user device via the user-side user interface; and transmit, to the terminal device and based on receiving the operation information, a response that indicates the performance of the operation of the exchange.

In some implementations, a method of offloading an operation on a user device includes receiving, by the user device, presentation information that identifies content for a user-side user interface for performing the operation at the user device, where the operation is for an exchange initiated at a terminal device that is configured to present a terminal-side user interface for performing the operation of the exchange; presenting, at the user device and based on the content, the user-side user interface for performing the operation; obtaining, by the user device and via the user-side user interface, a user input associated with a performance of the operation of the exchange at the user device; and transmitting, by the user device, operation information associated with the performance of the operation of the exchange at the user device.

DETAILED DESCRIPTION

Figure 1A:
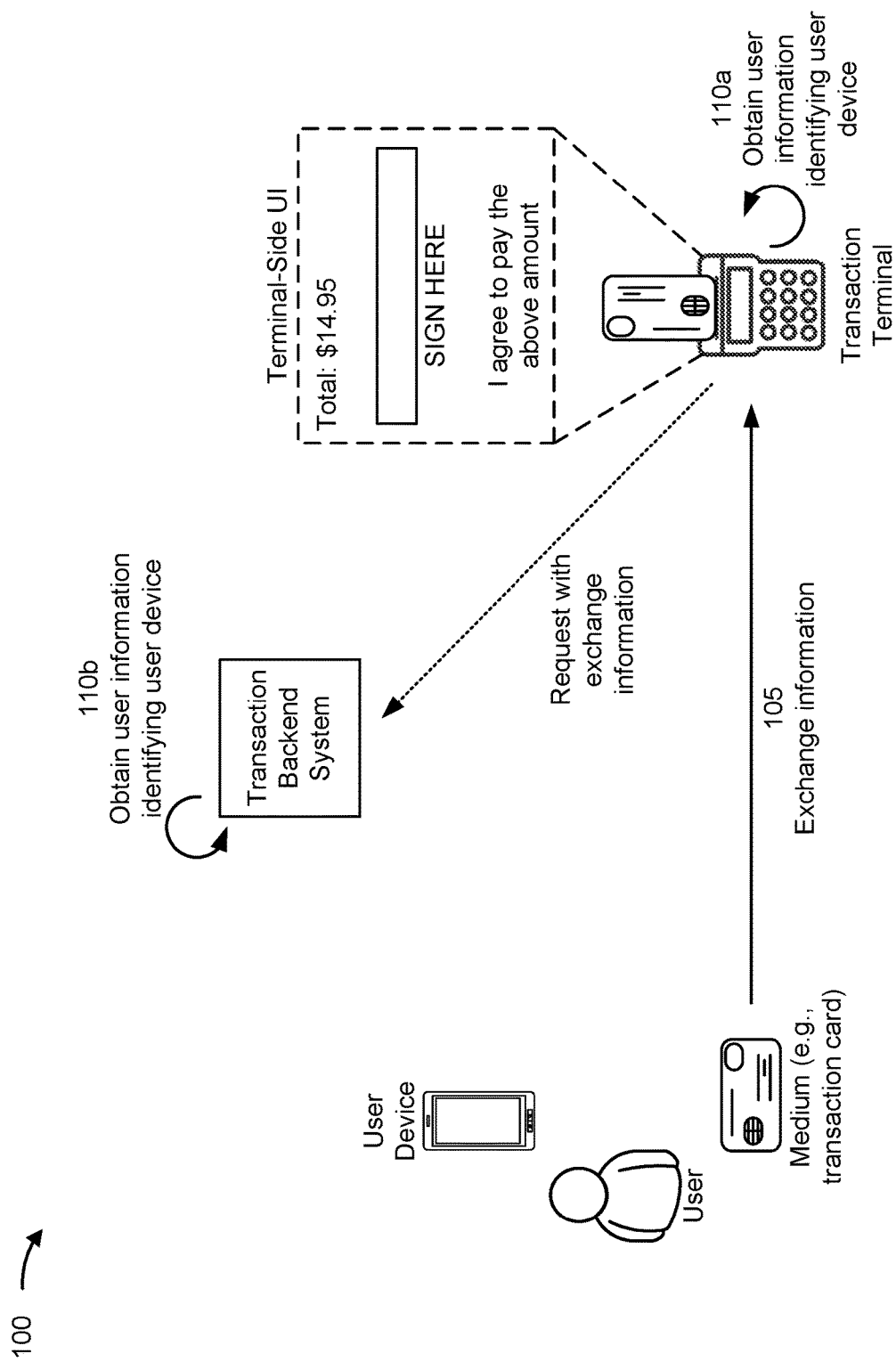
FIGS. 1A-1D are diagrams of an example implementation relating to offloading a transaction operation to a user device.

The following detailed description of example implementations refers to the accompanying drawings. The same reference numbers in different drawings may identify the same or similar elements.

A transaction terminal may display a user interface (UI) for performing operations of a transaction initiated at the transaction terminal. For example, the UI may provide an input for a customer to enter a signature, select a payment method (e.g., debit or credit), and/or select a gratuity amount (e.g., 10%, or 15%, or 20%), among other examples.

One problem with the UI of the transaction terminal is that the UI may be used by thousands or even millions of customers transacting with a merchant. For example, each customer that conducts a transaction at the transaction terminal may touch a touchscreen of the transaction terminal to interact with the UI (e.g., to select a payment method or a gratuity amount) or hold a stylus of the transaction terminal to interact with the UI (e.g., to enter a signature). In some cases, one or more of the customers that conduct transactions at the transaction terminal may carry infectious diseases (e.g., viruses).

As a result, the transaction terminal may proliferate the spread of such infectious diseases among the customers that must touch the transaction terminal to complete transactions using the UI. To reduce the risk of disease spread by the transaction terminal, the merchant may engage in frequent manual cleaning of the transaction terminal. However, this may require significant time expenditures as well as downtime for the transaction terminal.

In addition, use of the transaction terminal by numerous customers may cause another problem of excessive use of the transaction terminal. In some cases, the transaction terminal may be a mobile device that is connected with a card reader, and the mobile device may not have access to power (e.g., a wall outlet). Accordingly, presentation of the UI on the transaction terminal for tens or hundreds of transactions in a day may result in excessive usage of the mobile device's computing resources and/or battery resources.

In some implementations, to solve the problems described above, as well as a related technical problem of how to offload from a transaction terminal a UI for performing operations of a transaction, a technical solution is described herein for offloading operations of a transaction initiated at a transaction terminal to a user device. For example, the user device may present a UI for performing operations (e.g., entering a signature, selecting a payment method, or selecting a gratuity amount) of a transaction initiated at the transaction terminal. In some implementations, upon initiation of the transaction at the transaction terminal, the transaction terminal may identify an association between a payment medium (e.g., a transaction card) used for the transaction and the user device. Alternatively, the transaction terminal may transmit the transaction details to a transaction backend system where the association between the payment medium and the user device is identified. In cases when the association cannot be identified, the transaction terminal may display an authentication code, such as a two-dimensional code, for scanning into the user device to thereby identify the user device as being associated with the payment medium. Based on identifying the user device, the transaction terminal or the backend system may transmit information to the user device that identifies a UI for presentation on the user device. The user device may receive a user input via the UI, which the user device may transmit to the transaction terminal or the backend system for completing the transaction.

In this way, operations for a transaction that would otherwise be performed at a transaction terminal can be offloaded to a user device. In particular, the presentation of a UI for performing one or more operations can be offloaded from the transaction terminal to a user device. This distributes the computing requirements associated with repetitive presentation of the UI and capture of user input to multiple user devices. Accordingly, the transaction terminal conserves computing resources and/or battery resources, which may be more scarce for the transaction terminal relative to a user device (e.g., the computing and battery usage imposed on a user device may be for a single transaction, whereas the computing and battery usage imposed on the transaction device may be for numerous transactions in the course of a day). Moreover, the UI for presentation on a user device can take advantage of various capabilities of the user device to provide more robust features for the UI than would be possible on the transaction terminal.

By offloading transaction operations involving a UI from a transaction terminal to a user device, customer interaction with the transaction terminal can be reduced. For example, it may not be necessary for a customer to touch the transaction terminal in order to complete a transaction. Accordingly, transactions can be completed in a contactless manner, which may provide an improved experience. Moreover, improvements with regard to the spread of infectious diseases can be realized. Furthermore, the transaction terminal may require less frequent cleaning, which increases an uptime of the transaction terminal and reduces time spent on manually cleaning the transaction terminal.

FIGS. 1A-1D are diagrams of an example 100 associated with offloading a transaction operation to a user device. As shown in FIGS. 1A-1D, example 100 includes a user device, a transaction terminal (e.g., a terminal device), and a transaction backend system (e.g., which may include one or more devices). These devices are described in more detail in connection with FIGS. 2 and 3. In some examples, the transaction terminal may be associated with an entity, such as a merchant, and the user device may be associated with a user, such as a customer, of the entity. The transaction terminal may facilitate a transaction (which may be used interchangeably with "exchange" herein) between the entity and the user. For example, the transaction terminal may be configured to present a terminal-side UI (i.e., a terminal device-side UI) for performing an operation of a transaction. As an example, the terminal-side UI may include one or more inputs for a user to enter a signature, select a payment method, select a gratuity amount, and/or enter feedback, among other examples. Additionally, the user device may be capable of presenting a user-side UI (i.e., a user device-side UI), as described below. In some examples, the transaction backend system may be associated with a financial institution or a merchant account provider (e.g., associated with a card reader of the transaction terminal).

While the following description is in terms of an example of a payment transaction at a transaction terminal, the description is not limited to this particular example. Implementations herein also apply to other transactions that may be performed in connection with a terminal device. For example, the transaction may be a package delivery where a user is to sign for the package to complete the transaction.

As shown in FIG. 1A and by reference number 105, the transaction terminal may obtain exchange information. The exchange information may be associated with a transaction (e.g., an exchange, between a user and the entity, of payment for goods and/or services) initiated at the transaction terminal. The transaction may be initiated by the user swiping, inserting, or tapping a transaction card at the transaction terminal, or by the user using a contactless payment method (e.g., an account associated with a digital wallet of the user device) at the transaction terminal.

The exchange information may identify a medium (e.g., a transaction device) used in the transaction. For example, the medium may be a transaction card or a credential (e.g., for a transaction account), among other examples. Accordingly, the exchange information may include an identifier of the medium (e.g., a card number or an account number). The exchange information may, additionally or alternatively, identify an amount of the transaction, an itemized list of goods and/or services of the transaction, a time of the transaction, a location of the transaction, an identifier of the transaction terminal, and/or an identifier of the entity associated with the transaction terminal, among other examples.

In some implementations, the transaction terminal may transmit, and the transaction backend system may receive, a request associated with the transaction. For example, the request may be an authentication request for the transaction. The request may identify the exchange information obtained at the transaction terminal.

As shown by reference number 110*a*, the transaction terminal may obtain user information that identifies the user device of the user that initiated the transaction at the transaction terminal. The user information may identify the user device by a phone number of the user device, a device identifier of the user device, or an identifier (e.g., a user identifier) associated with an application executable on the user device. In some implementations, the user information also may identify a signature of record for the medium. Additionally, the user information may identify whether the user device is capable of presenting the user-side UI (e.g., an application for presenting the user-side UI is installed on the user device) and/or whether the user device is associated with an authorization to present to the user-side UI (e.g., the user indicated a desire to use the user device for contactless transactions).

In some implementations, the transaction terminal may obtain the user information from a data structure (e.g., a database) accessible to the transaction terminal. The transaction terminal may obtain the user information based on the exchange information. For example, the user information may be stored in association with an identifier of the medium used in the transaction. In some implementations, the transaction terminal may have obtained the user information in one or more previous transactions involving the medium. For example, in a previous transaction involving the medium, the user may have provided the phone number of the user device, and the transaction terminal may have stored the phone number in association with an identifier of the medium. As another example, in a previous transaction involving the medium, the transaction terminal and the user device may have exchanged device information as part of a connection procedure for short-range wireless communication (e.g., near-field communication (NFC) or Bluetooth communication), and the transaction terminal may have stored the device information for the user device in association with an identifier of the medium.

In some implementations, the transaction terminal may determine the user information that identifies the user device. The transaction terminal may use historical exchange data to identify the user device. For example, the historical exchange data may identify an association between the user device and one or more previous transactions (e.g., based on the user device being present during the previous transactions, the user device being used in the previous transactions, or the user device establishing communications with the transaction terminal in the previous transactions, among other examples). The historical exchange data may identify, for a previous transaction, a time of the previous transaction, a location of the previous transaction, an amount of the previous transaction, and/or goods or services involved in the previous transaction. Accordingly, the transaction terminal may determine that the transaction is likely to be associated with the same user (and user device) that performed one or more of the previous transactions identified by the historical exchange data. In some implementations, the transaction terminal may use a machine learning model to identify the user device based on the transaction (e.g., using the exchange information for the transaction as an input to the machine learning model).

The transaction terminal may use location data to identify the user device. For example, the transaction terminal may obtain terminal location data relating to a location of the transaction terminal, and may obtain user location data from an application executing on the user device. The user location data may identify a location of the user device at one or more time points. The transaction terminal may identify the user device based on a determination that the terminal location data and the user location data indicates that the user device is within a threshold distance of the transaction terminal at the time of the transaction (e.g., at the time when the transaction is initiated).

The transaction terminal may use image data to identify the user device. For example, the transaction terminal may capture an image of the user at the time of the transaction (e.g., at the time when the transaction is initiated). The transaction terminal may perform, or cause another device to perform, a facial recognition technique on the image to identify the user. The transaction terminal may identify the user device based on information that indicates an association between the user and the user device (e.g., information that associates an image of the user and the user device, which may have been obtained, for example, as part of a previous registration of the user and/or the user device).

In some implementations, the transaction terminal may obtain the user information that identifies the user device based on establishing short-range wireless communication with the user device. For example, the user may bring the user device to within a threshold proximity of the transaction terminal, which may initiate a connection procedure for short-range wireless communication between the transaction terminal and the user device. Here, the transaction terminal may identify the user device based on device information exchanged as part of the connection procedure.

In some examples, the transaction terminal may be unable to obtain the user information identifying the user device (e.g., the user information is selectively obtained by the transaction terminal based on whether the transaction terminal can retrieve the user information from the data structure or determine the user information). Here, the transaction terminal may display an authentication code that is to be input (e.g., scanned) to the user device based on determining that the user information is not obtained by the transaction terminal. The authentication code may be a two-dimensional code such as a quick response (QR) code. The user device may scan the authentication code displayed at the transaction terminal, which may cause the user device to launch an application and/or to access a webpage (e.g., that includes the user-side UI, as described below).

As shown by reference number 110b, the transaction backend system may obtain user information identifying the user device in a similar manner as that described above (e.g., in addition to, or alternatively to, the transaction terminal obtaining the user information). For example, the transaction backend system may identify the user device based on the exchange information received in the request from the transaction terminal. As another example, the transaction backend system may determine that the user information cannot be obtained, and may transmit a message to the transaction terminal indicating that the transaction terminal is to display an authentication code, as described above. As a further example, the transaction backend system may determine the user information based on historical exchange data, location data, and/or image data (e.g., transmitted from the transaction terminal to the transaction backend system), as described above.

Figure 1B:
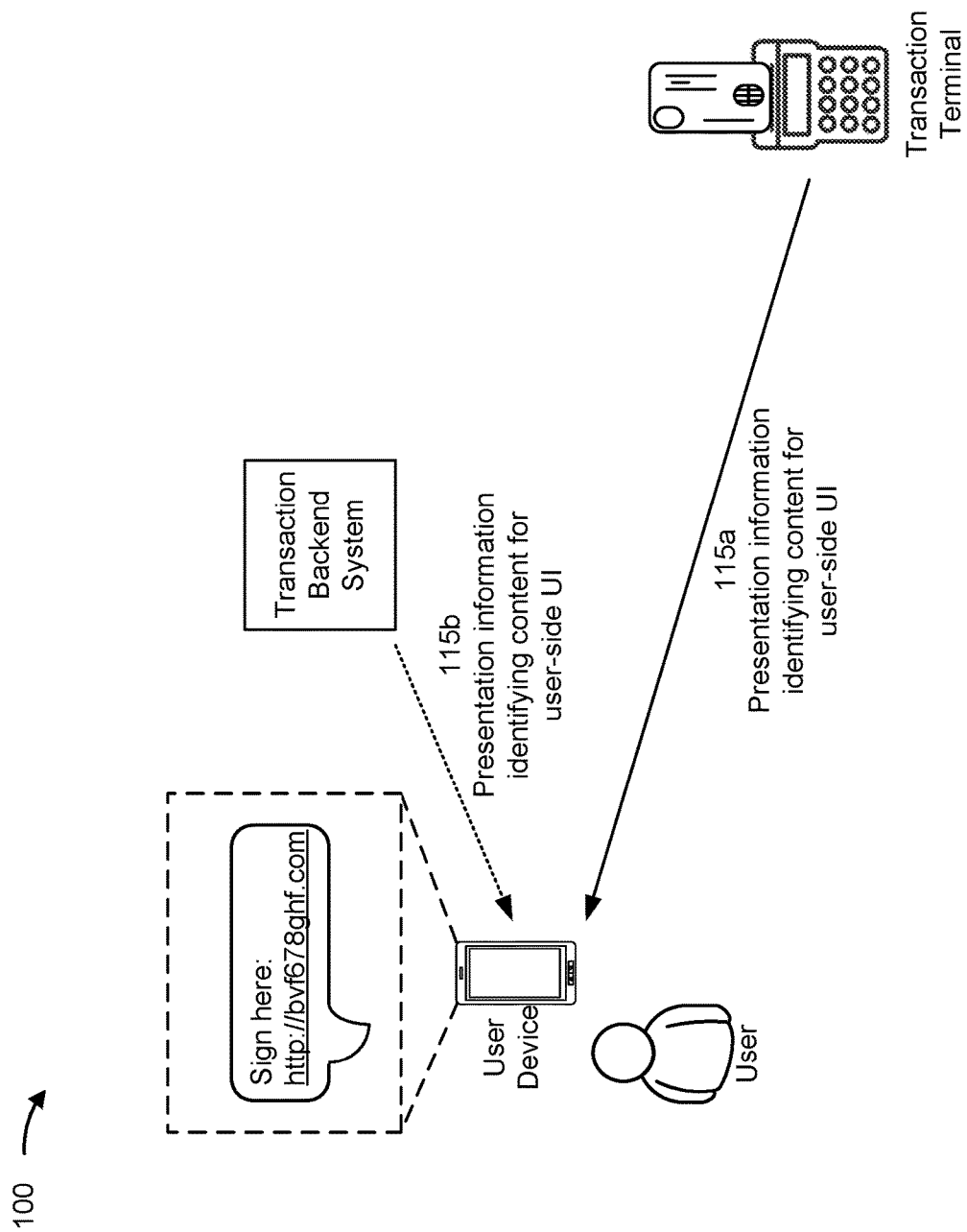

As shown in FIG. 1B and by reference number 115a, the transaction terminal may transmit, and the user device may receive, presentation information that identifies a content of a user-side UI for performing an operation of the transaction. The transaction terminal may transmit the presentation information based on obtaining the user information that identifies the user device. In some implementations, the transaction terminal may transmit the presentation information based on a determination that the user device is capable of displaying the user-side UI and/or that the user device is associated with an authorization to present the user-side UI.

The transaction terminal may transmit, or cause another device to transmit, the presentation information in a message to the user device (e.g., when the user information identifies a phone number for the user device). For example, the message may be a short message service (SMS) message or another type of text message. Here, the presentation information may include a link to a webpage that includes the content for the user-side UI.

The transaction terminal may transmit, or cause another device to transmit, the presentation information in a notification to the user device (e.g., when the user information identifies a device identifier or an identifier associated with an application on the user device). For example, the notification may be a push notification associated with the application or a notification associated with a short-range wireless communication connection between the user device and the transaction terminal. Here, the presentation information may include a link to a webpage, as described above, or a pointer to the content for the user-side UI at the application. In some implementations, the transaction terminal may transmit the presentation information in a command (e.g., a command associated with the application or the short-range wireless communication connection). Here, the presentation information may include a command that causes the user device to access the webpage or the application, as described above.

In some implementations, the presentation information may be identified by an authentication code displayed by the transaction terminal and scanned by the user device. For example, the user device may access a webpage that includes the user-side UI based on scanning an authentication code displayed at the transaction terminal, as described above.

As described above, the user-side UI may enable the user to perform an operation of the transaction at the user device rather than at the transaction terminal. The operation may be a signing operation (e.g., entering a signature of the user), a gratuity selection operation (e.g., selecting an amount of gratuity that is to be added to the transaction), a medium type selection operation (e.g., selecting a type, such as credit or debit, of the medium used in the transaction), and/or a feedback operation (e.g., entering feedback for the entity and/or a good or a service involved in the transaction), among other examples.

In some implementations, the transaction terminal may determine the content of the user-side UI that is to be identified in the presentation information based on determining one or more operations of the transaction that are to be performed at the user device. For example, the transaction terminal may determine the one or more operations based on whether the transaction involves goods or services (e.g., the one or more operations may include a gratuity selection operation if the transaction involves services), a time of the transaction, a location of the transaction, and/or a type of item involved in the transaction (e.g., the one or more operations may include a signing operation if the item is associated with an age restriction), among other examples.

In some implementations, a set of operations to be performed at the user device via the user-side UI are different from a set of operations that can be performed via the terminal-side UI. For example, a feedback operation may be performed at the user device using a keyboard or speech recognition, which may not be possible or practical at the transaction terminal.

As shown by reference number 115b, the transaction backend system may transmit presentation information to the user device, and the presentation information may identify a content of a user-side UI that is to be presented by the user device, in a similar manner as described above. For example, the transaction backend system may determine the content of the user-side UI that is to be identified in the presentation information based on determining one or more operations of the transaction that are to be performed at the user device, in a similar manner as described above.

Figure 1C:
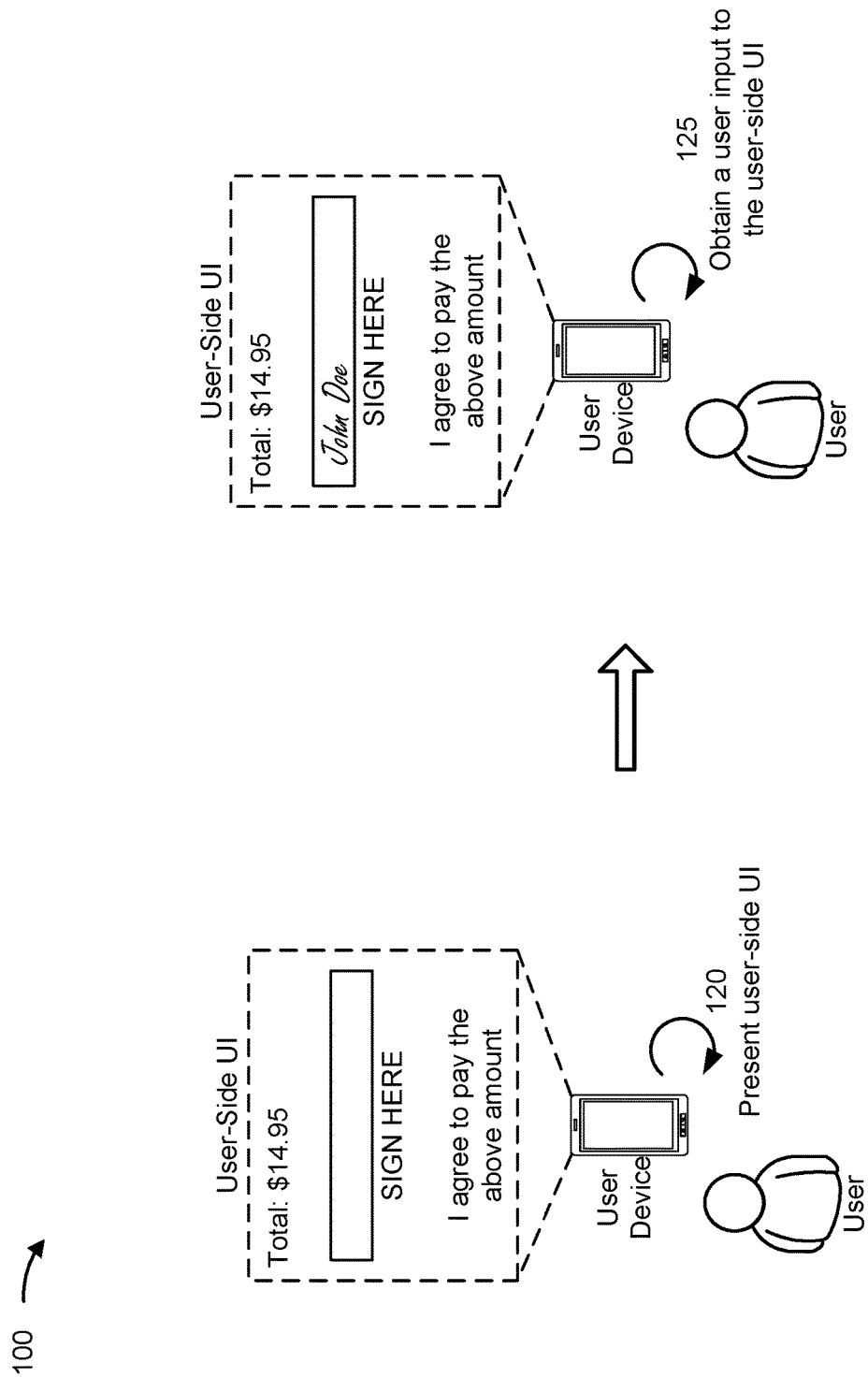

As shown in FIG. 1C and by reference number 120, the user device may present the user-side UI. The user-side UI presented by the user device may be based on the presentation information transmitted from the transaction terminal and/or the transaction backend system. For example, the user device may present the user-side UI based on accessing a link included in a message, following a pointer included in a notification, and/or executing a command. In some implementations, the user device may present the user-side UI based on scanning an authentication code displayed by the transaction terminal. In some implementations, the transaction terminal may present the terminal-side UI at the same time (e.g., overlapping in time) that the user device presents the user-side UI.

The user-side UI may include one or more inputs (and associated prompts) for performance of a signing operation, a gratuity selection operation, a medium type selection operation, and/or a feedback operation, among other examples, by the user. The user-side UI may include a single UI or multiple UIs presented in series. In some examples, the user-side UI may integrate, or otherwise interface with, input systems of the user device. For example, the user-side UI may integrate a keyboard of the user device (e.g., for entering feedback), a speech recognition system of the user device, and/or a camera of the user device (e.g., for capturing an image of the entity or an item involved in the transaction, for example, for including with feedback). In some examples, the user-side UI may enable access to data stored on the user device. For example, the user-side UI may enable the user to select a signature image stored on the user device as an alternative to manually entering a signature into the user-side UI. In this way, the user-side UI may provide a more robust UI than the terminal-side UI.

As shown by reference number 125, the user device may obtain a user input to the user-side UI. That is, the user may perform one or more operations of the transaction at the user device via the user-side UI. For example, the user input may be a signature, a selection of a gratuity amount, a selection of a type of the medium, and/or feedback for the entity or goods or services involved in the transaction. In this way, one or more operations of the transaction may be offloaded from the transaction terminal to the user device, and the user may complete the transaction without touching the transaction terminal.

Figure 1D:
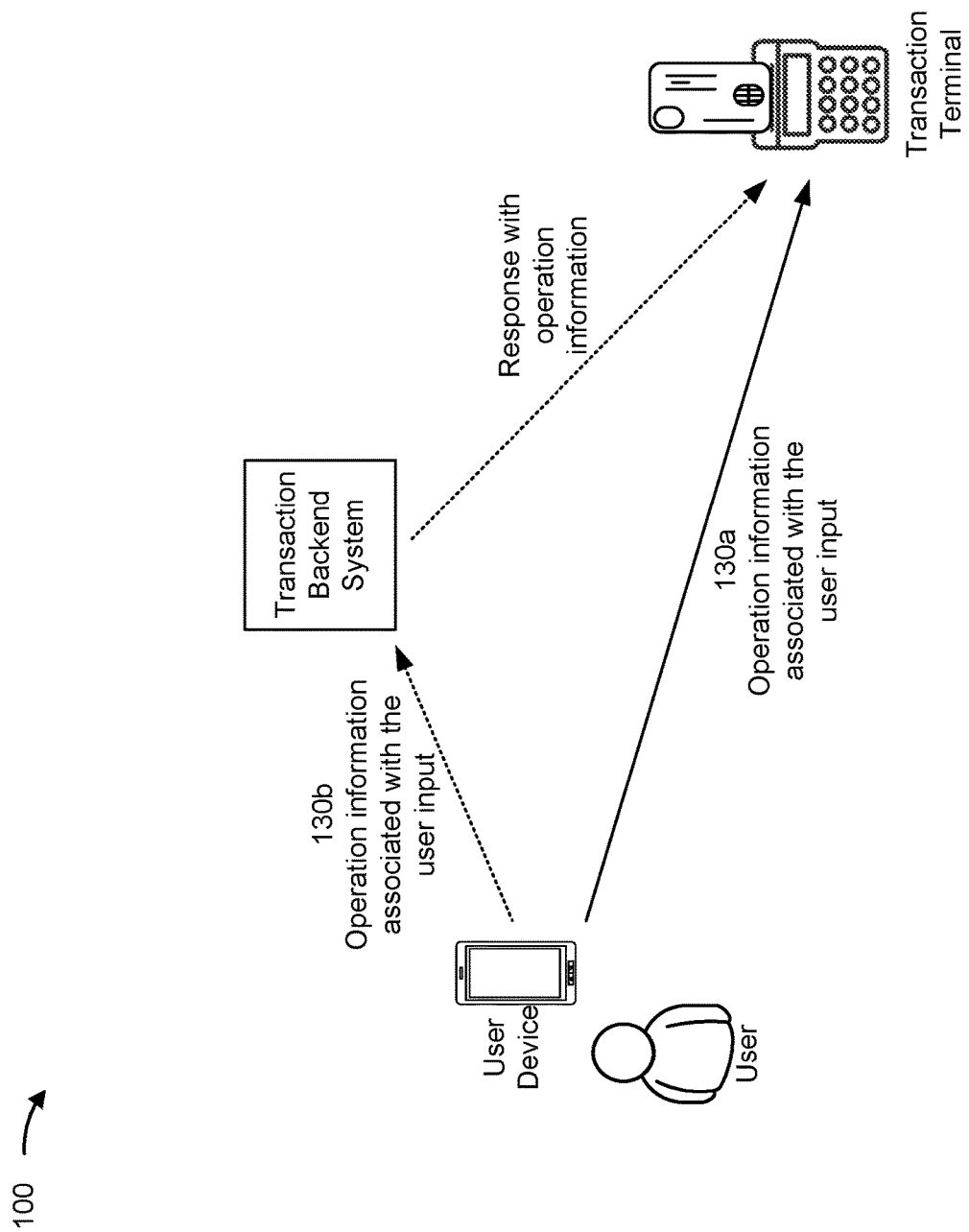

As shown in FIG. 1D and by reference number 130a, the user device may transmit, and the transaction terminal may receive, operation information associated with the user input. For example, the operation information may include signing information associated with a signature entered in the user-side UI (e.g., image data associated with the signature, or an indication that the signature was entered), selection information associated with a selection of a gratuity amount and/or a medium type in the user-side UI, and/or feedback information associated with feedback entered in the user-side UI, among other examples. In some implementations, the transaction terminal may update the terminal-side UI presented at the transaction terminal based on the operation information. For example, the transaction terminal may update the terminal-side UI to display the signature entered in the user-side UI and/or to display a selection of a gratuity amount and/or a medium type entered in the user-side UI. This may provide confirmation to the user that the operation information was successfully received by the transaction terminal.

In some implementations, the transaction terminal may determine whether a signature entered in the user-side UI is indicative of a fraudulent use of the medium based on comparing the signature to a signature of record for the medium (e.g., obtained in the user information). In some implementations, the transaction terminal may transmit, to the user device and based on receiving the operation information, information associated with the transaction. For example, the transaction terminal may transmit a receipt for the transaction. In some implementations, the transaction terminal may transmit, to the user device and based on receiving the operation information, a request for feedback on the entity and/or goods or services involved in the transaction. Accordingly, the user device may transmit a response to the request to the transaction terminal.

The transaction terminal may transmit (e.g., based on receiving the operation information), and the transaction backend system may receive, a request associated with the transaction. For example, the request may be an authentication request for the transaction. The request may identify the exchange information obtained at the transaction terminal and the operation information received by the transaction terminal. The transaction terminal may transmit the request based on a determination that a network connection (e.g., an Internet connection) is available for the transaction terminal. In some implementations, the transaction terminal may determine that the network connection is not available, and the transaction terminal may store the exchange information and the operation information. The transaction terminal may transmit the request, with the stored exchange information and the operation information, based on a subsequent determination that the network connection is available.

As shown by reference number 130b, the user device may transmit, and the transaction backend system may receive, operation information associated with the user input, in a similar manner as described above (e.g., in addition to, or alternatively to, transmitting the operation information to the transaction terminal). Here, the transaction backend system may forward the operation information to the transaction terminal in a response to the request of the transaction terminal. For example, the response may be an authentication response in response to the authentication request transmitted by the transaction terminal. As an example, the response may indicate an authorization for the medium used in the transaction.

In some implementations, the transaction backend system may determine whether a signature entered in the user-side UI is indicative of a fraudulent use of the medium, in a similar manner as described above. Here, the transaction backend system may transmit the response (e.g., indicating the authorization) based on a determination that the signature entered in the user-side UI (e.g., the signature identified by the operation information) corresponds to the signature of record for the medium (e.g., obtained in the user information). In some implementations, the transaction backend system may transmit, to the user device and based on receiving the operation information, information associated with the transaction. For example, the transaction backend system may transmit information that identifies at least one of an aggregate exchange total associated with the medium (e.g., a balance associated with the medium over a particular time period) or a budget associated with the transaction (e.g., an aggregate amount of transactions of the user in a particular category associated with the transaction). In some implementations, the transaction backend system may transmit, to the user device and based on receiving the operation information, a request for feedback, in a similar manner as described above.

In this way, the user may perform the transaction at the transaction terminal with limited interaction with the transaction terminal and without physically touching the transaction terminal. Moreover, transaction operations that would otherwise involve processing at the transaction terminal may be offloaded to the user device.

As indicated above, FIGS. 1A-1D are provided as an example. Other examples may differ from what is described with regard to FIGS. 1A-1D.

Figure 2:
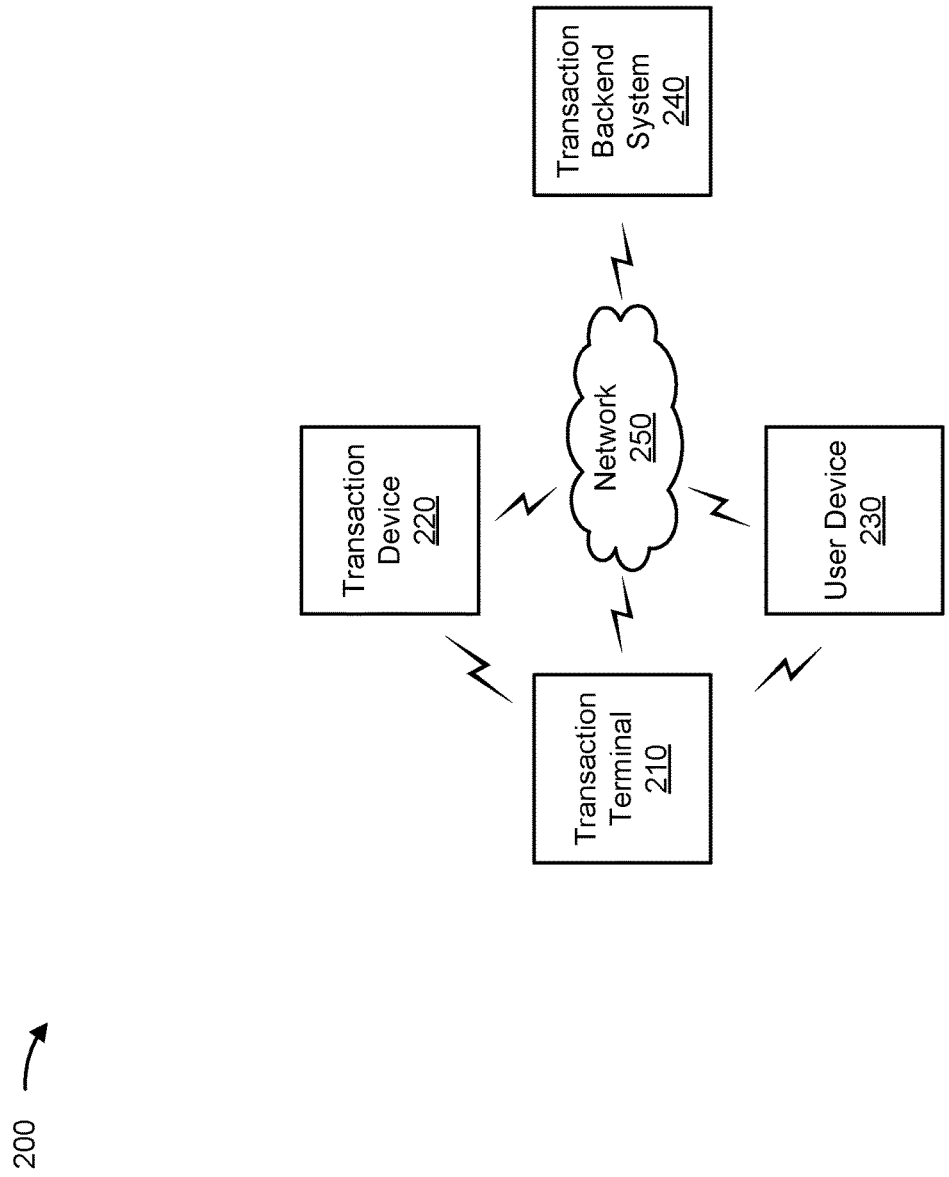
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a transaction terminal 210, a transaction device 220, a user device 230, a transaction backend system 240, and a network 250. Devices of environment 200 may interconnect via wired connections and/or wireless connections.

The transaction terminal 210 (e.g., a terminal device) includes one or more devices capable of facilitating an electronic transaction associated with the transaction device 220. For example, the transaction terminal 210 may include a point-of-sale (PoS) terminal, a payment terminal (e.g., a credit card terminal, a contactless payment terminal, a mobile credit card reader, or a chip reader), and/or an automated teller machine (ATM). The transaction terminal 210 may include one or more input components and/or one or more output components to facilitate obtaining data (e.g., account information) from the transaction device 220 and/or to facilitate interaction with and/or authorization from an owner or accountholder of the transaction device 220. Example input components of the transaction terminal 210 include a number keypad, a touchscreen, a magnetic stripe reader, a chip reader, and/or a radio frequency (RF) signal reader (e.g., a near-field communication (NFC) reader). Example output devices of transaction terminal 210 include a display and/or a speaker.

The transaction device 220 (e.g., a payment medium) includes one or more devices capable of being used for an electronic transaction. In some implementations, the transaction device 220 includes a transaction card (or another physical medium with integrated circuitry) capable of storing and communicating account information, such as a credit card, a debit card, a gift card, an ATM card, a transit card, a fare card, and/or an access card. In some implementations, the transaction device 220 may be the user device 230 or may be integrated into the user device 230. For example, the user device 230 may execute an electronic payment application capable of performing functions of the transaction device 220 described herein. Thus, one or more operations described herein as being performed by the transaction device 220 may be performed by a transaction card, the user device 230, or a combination thereof.

The transaction device 220 may store account information associated with the transaction device 220, which may be used in connection with an electronic transaction facilitated by the transaction terminal 210. The account information may include, for example, an account identifier that identifies an account (e.g., a bank account or a credit account) associated with the transaction device 220 (e.g., an account number, a card number, a bank routing number, and/or a bank identifier), a cardholder identifier (e.g., identifying a name of a person, business, or entity associated with the account or the transaction device 220), expiration information (e.g., identifying an expiration month and/or an expiration year associated with the transaction device 220), and/or a credential (e.g., a payment token). In some implementations, the transaction device 220 may store the account information in tamper-resistant memory of the transaction device 220, such as in a secure element. As part of performing an electronic transaction, the transaction device 220 may transmit the account information to the transaction terminal 210 using a communication component, such as a magnetic stripe, an integrated circuit (IC) chip (e.g., a EUROPAY®, MASTERCARD®, VISA® (EMV) chip), and/or a contactless communication component (e.g., an NFC component, a radio frequency (RF) component, a Bluetooth component, and/or a Bluetooth Low Energy (BLE) component). Thus, the transaction device 220 and the transaction terminal 210 may communicate with one another by coming into contact with one another (e.g., using a magnetic stripe or an EMV chip) or via contactless communication (e.g., using NFC).

The user device 230 includes one or more devices capable of being used for an electronic transaction, as described above in connection with the transaction device 220. The user device 230 may include a communication device and/or a computing device. For example, the user device 230 may include a wireless communication device, a mobile phone, a user equipment, a tablet computer, a wearable communication device (e.g., a smart wristwatch, a pair of smart eyeglasses, a head mounted display, or a virtual reality headset), or a similar type of device. Additionally, or alternatively, the user device 230 may be capable of receiving, generating, storing, processing, and/or providing information associated with a UI for performing one or more operations of a transaction, as described elsewhere herein.

The transaction backend system 240 includes one or more devices capable of processing, authorizing, and/or facilitating a transaction. For example, the transaction backend system 240 may include one or more servers and/or computing hardware (e.g., in a cloud computing environment or separate from a cloud computing environment) configured to receive and/or store information associated with processing an electronic transaction. The transaction backend system 240 may process a transaction, such as to approve (e.g., permit, authorize, or the like) or decline (e.g., reject, deny, or the like) the transaction and/or to complete the transaction if the transaction is approved. The transaction backend system 240 may process the transaction based on information received from the transaction terminal 210, such as transaction data (e.g., information that identifies a transaction amount, a merchant, a time of a transaction, a location of the transaction, or the like), account information communicated to the transaction terminal 210 by the transaction device 220 (the transaction data and the account information may be referred to individually or collectively herein as exchange information), and/or information stored by the transaction backend system 240 (e.g., for fraud detection).

The transaction backend system 240 may be associated with a financial institution (e.g., a bank, a lender, a credit card company, or a credit union), may be associated with a merchant account provider, and/or may be associated with a transaction card association that authorizes a transaction and/or facilitates a transfer of funds. For example, the transaction backend system 240 may be associated with an issuing bank associated with the transaction device 220, an acquiring bank (or merchant bank) associated with the merchant and/or the transaction terminal 210, a merchant account provider associated with the transaction terminal 210, and/or a transaction card association (e.g., VISA® or MASTERCARD®) associated with the transaction device 220. Based on receiving information associated with the transaction device 220 from the transaction terminal 210, one or more devices of the transaction backend system 240 may communicate to authorize a transaction and/or to transfer funds from an account associated with the transaction device 220 to an account of an entity (e.g., a merchant) associated with the transaction terminal 210.

The network 250 includes one or more wired and/or wireless networks. For example, the network 250 may include a cellular network, a public land mobile network, a local area network, a wide area network, a metropolitan area network, a telephone network, a private network, the Internet, and/or a combination of these or other types of networks. The network 250 enables communication among the devices of environment 200. In some implementations, the transaction terminal 210 may communicate with the transaction device 220 using a first network (e.g., a contactless network or by coming into contact with the transaction device 220) and may communicate with the transaction backend system 240 using a second network.

The quantity and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
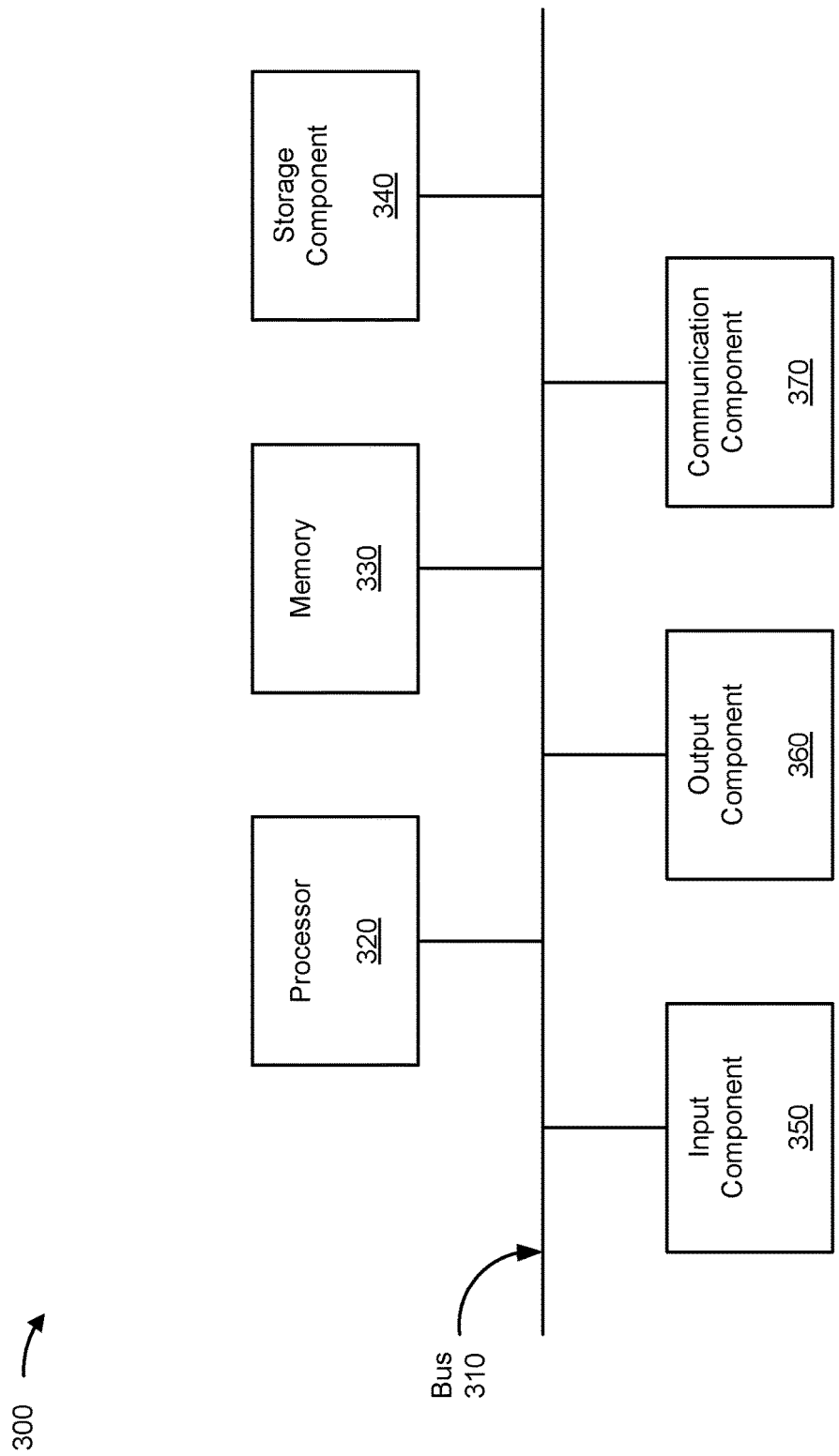
FIG. 3 is a diagram of example components of one or more devices of FIG. 2.

FIG. 3 is a diagram of example components of a device 300, which may correspond to a transaction terminal (e.g., transaction terminal 210), a transaction device (e.g., transaction device 220), a user device (e.g., user device 230), and/or a device of a transaction backend system (e.g., transaction backend system 240). In some implementations, transaction terminal (e.g., transaction terminal 210), a transaction device (e.g., transaction device 220), a user device (e.g., user device 230), and/or a device of a transaction backend system (e.g., transaction backend system 240) may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
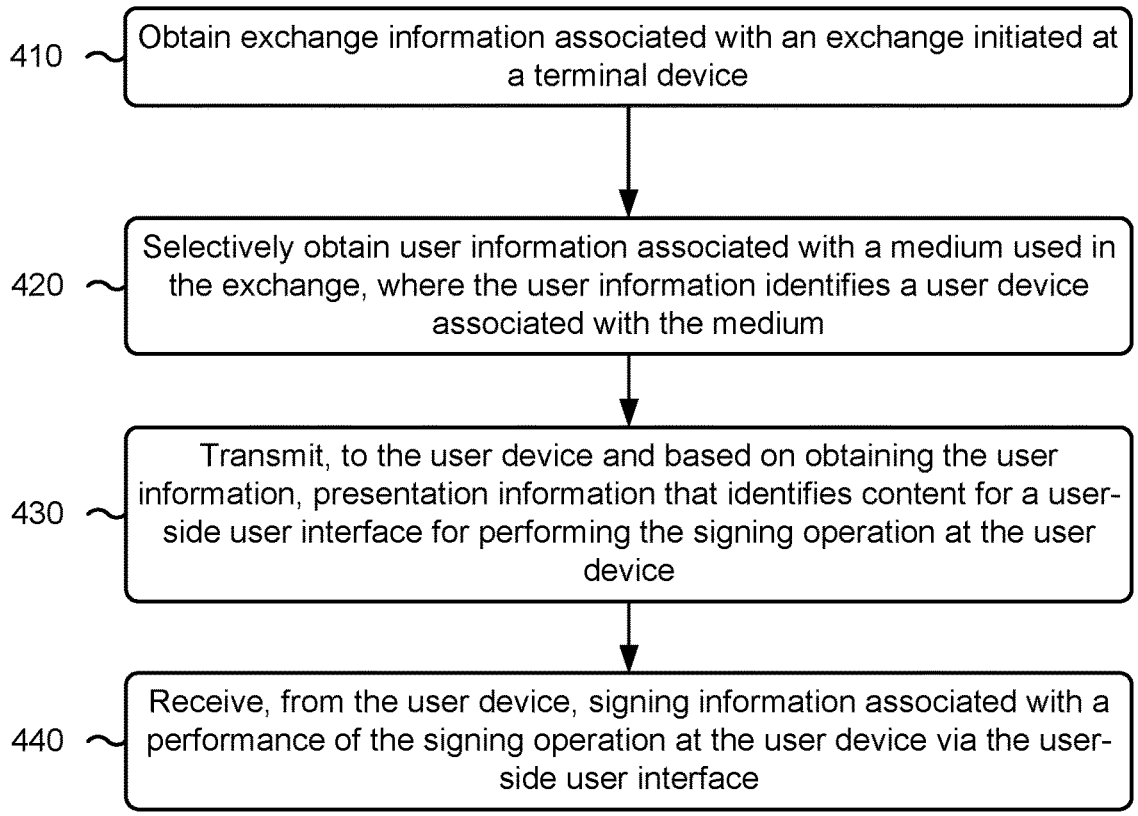
FIGS. 4-6 are flowcharts of example processes relating to offloading a transaction operation to a user device.

FIG. 4 is a flowchart of an example process 400 associated with offloading a signing operation on a user device. In some implementations, one or more process blocks of FIG. 4 may be performed by a terminal device (e.g., transaction terminal 210). In some implementations, one or more process blocks of FIG. 4 may be performed by another device or a group of devices separate from or including the terminal device, such as a transaction device (e.g., transaction device 220), a user device (e.g., user device 230), and/or a device of a transaction backend system (e.g., transaction backend system 240). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include obtaining exchange information associated with an exchange initiated at a terminal device (block 410). In some implementations, the exchange information identifies a medium used in the exchange. In some implementations, the terminal device is configured to present a terminal-side user interface for performing a signing operation of the exchange. As further shown in FIG. 4, process 400 may include selectively obtaining user information associated with a medium used in the exchange, where the user information identifies a user device associated with the medium (block 420). As further shown in FIG. 4, process 400 may include transmitting, to the user device and based on obtaining the user information, presentation information that identifies content for a user-side user interface for performing the signing operation at the user device (block 430). As further shown in FIG. 4, process 400 may include receiving, from the user device, signing information associated with a performance of the signing operation at the user device via the user-side user interface (block 440).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
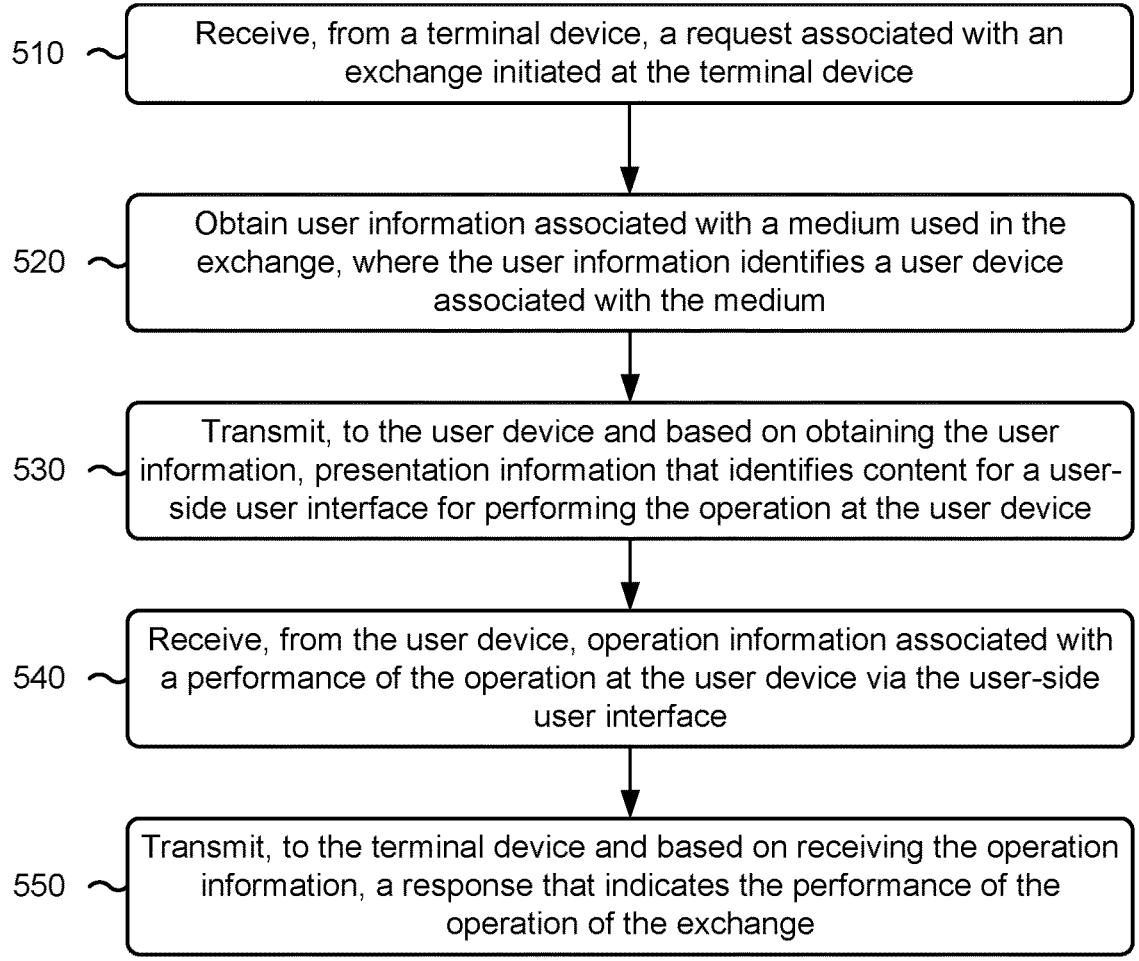

FIG. 5 is a flowchart of an example process 500 associated with offloading a signing operation on a user device. In some implementations, one or more process blocks of FIG. 5 may be performed by a transaction backend system device (e.g., a device of transaction backend system 240). In some implementations, one or more process blocks of FIG. 5 may be performed by another device or a group of devices separate from or including the transaction backend system device, such as a transaction terminal (e.g., transaction terminal 210), a transaction device (e.g., transaction device 220), and/or a user device (e.g., user device 230. Additionally, or alternatively, one or more process blocks of FIG. 5 may be performed by one or more components of device 300, such as processor 320, memory 330, storage component 340, input component 350, output component 360, and/or communication component 370.

As shown in FIG. 5, process 500 may include receiving, from a terminal device, a request associated with an exchange initiated at the terminal device (block 510). In some implementations, the request identifies a medium used in the exchange. In some implementations, the terminal device is configured to present a terminal-side user interface for performing an operation of the exchange. As further shown in FIG. 5, process 500 may include obtaining user information associated with the medium used in the exchange, where the user information identifies a user device associated with the medium (block 520). As further shown in FIG. 5, process 500 may include transmitting, to the user device and based on obtaining the user information, presentation information that identifies content for a user-side user interface for performing the operation at the user device (block 530). As further shown in FIG. 5, process 500 may include receiving, from the user device, operation information associated with a performance of the operation at the user device via the user-side user interface (block 540). As further shown in FIG. 5, process 500 may include transmitting, to the terminal device and based on receiving the operation information, a response that indicates the performance of the operation of the exchange (block 550).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
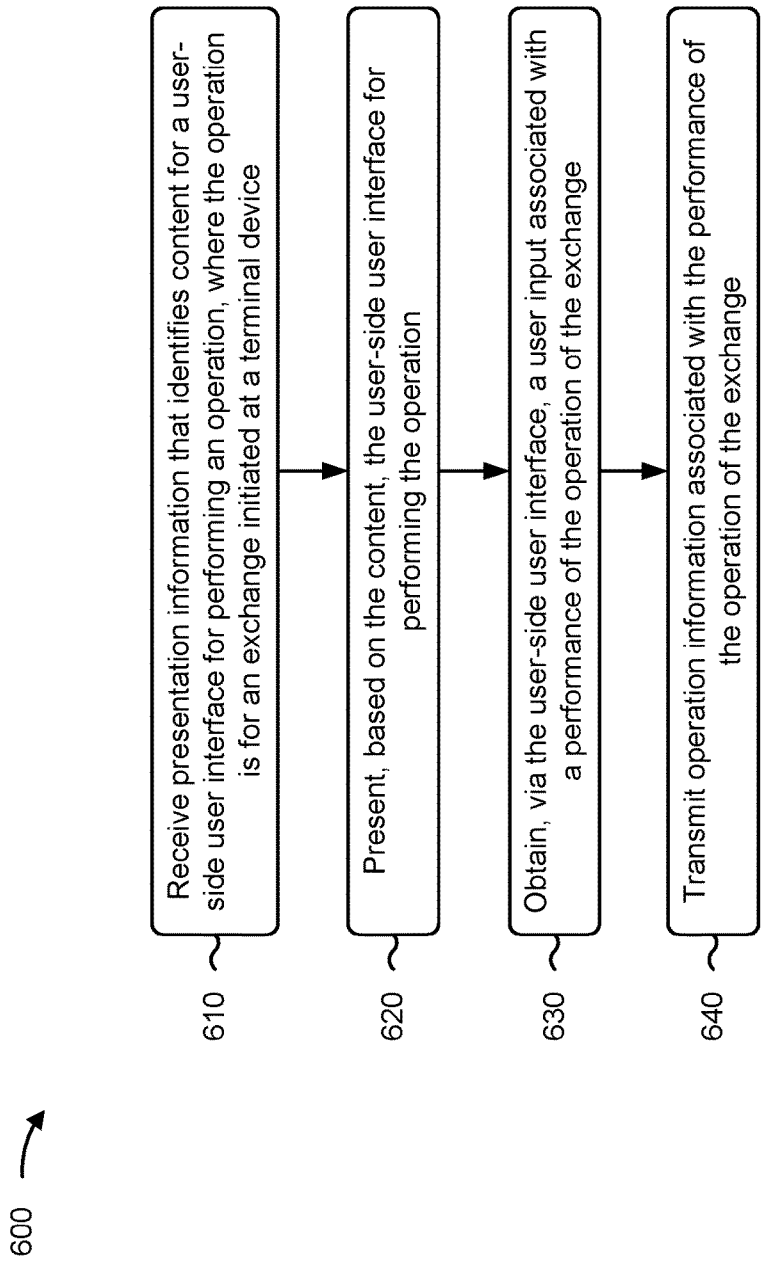

FIG. 6 is a flowchart of an example process 600 associated with offloading a signing operation on a user device. In some implementations, one or more process blocks of FIG. 6 may be performed by a user device (e.g., user device 230). In some implementations, one or more process blocks of FIG. 6 may be performed by another device or a group of devices separate from or including the user device, such as a transaction terminal (e.g., transaction terminal 210), a transaction device (e.g., transaction device 220), and/or a device of a transaction backend system (e.g., transaction backend system 240). Additionally, or alternatively, one or more process blocks of FIG. 6 may be performed by one or more components of device 300, such as processor 320, memory 330, storage component 340, input component 350, output component 360, and/or communication component 370.

As shown in FIG. 6, process 600 may include receiving presentation information that identifies content for a user-side user interface for performing an operation, where the operation is for an exchange initiated at a terminal device (block 610). In some implementations, the terminal device is configured to present a terminal-side user interface for performing the operation of the exchange. As further shown in FIG. 6, process 600 may include presenting, based on the content, the user-side user interface for performing the operation (block 620). As further shown in FIG. 6, process 600 may include obtaining, via the user-side user interface, a user input associated with a performance of the operation of the exchange (block 630). As further shown in FIG. 6, process 600 may include transmitting operation information associated with the performance of the operation of the exchange (block 640).

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used.

Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A non-transitory computer-readable medium storing a set of instructions comprising:
   one or more instructions that, when executed by one or more processors of a terminal device, cause the terminal device to:
      obtain exchange information associated with an exchange initiated at the terminal device,
         wherein the terminal device is configured to perform an operation associated with completing the exchange;
      obtain, based on the exchange information, user information associated with a user device;
      transmit, to the user device and to offload the operation to the user device, presentation information identifying content for the user device to use to perform the operation; and
      receive, from the user device and based on transmitting the presentation information, a response associated with performing the operation at the user device.

2. The non-transitory computer-readable medium of claim 1, wherein the operation is not performed by the terminal device based on offloading the operation to the user device.

3. The non-transitory computer-readable medium of claim 1, wherein the operation includes a signing operation, and wherein the terminal device is configured to present a terminal side user interface for performing the operation.

4. The non-transitory computer-readable medium of claim 1, wherein the exchange information identifies a payment medium used in the exchange, and wherein the user information identifies the user device.

5. The non-transitory computer-readable medium of claim 1, wherein the user device is associated with a user-side user interface that includes at least one input for entering a signature of a user of the user device.

6. The non-transitory computer-readable medium of claim 1, wherein the response identifies at least one of:
   image data associated with performance of a signing operation at the user device, or
   an indication of the performance of the signing operation at the user device.

7. The non-transitory computer-readable medium of claim 1, wherein the one or more instructions, when executed by the one or more processors, further cause the terminal device to:
   display an authentication code that is to be input to the user device in association with obtaining the user information.

8. The non-transitory computer-readable medium of claim 1, wherein the one or more instructions, when executed by the one or more processors, further cause the terminal device to:
   transmit, to a backend system and based on a determination that a network connection is available for the terminal device, a request identifying the exchange information and the response.

9. A system, comprising:
   one or more memories; and one or more processors, communicatively coupled to the one or more memories, configured to:
- receive, from a terminal device, a request associated with an exchange initiated at the terminal device, wherein the terminal device is configured to perform an operation associated with completing the exchange;
- obtain, from another device associated with the terminal device and based on the request, user information associated with a user device;
- transmit, to the user device and to offload the operation to the user device, presentation information identifying content for the user device to use to perform the operation; and
- transmit, to the terminal device and based on receiving operation information associated with a performance of the operation at the user device, a response that indicates the performance of the operation.

10. The system of claim 9, wherein the operation is at least one of a signing operation, a gratuity selection operation, a medium type selection operation, or a feedback operation.

11. The system of claim 9, wherein the operation is not performed by the terminal device based on offloading the operation to the user device.

12. The system of claim 9, wherein the terminal device is configured to present a terminal side user interface for performing the operation.

13. The system of claim 9, wherein the response is transmitted in association with a determination that a signature identified by the operation information corresponds to a signature associated with a medium associated with the exchange.

14. The system of claim 9, wherein the one or more processors are further configured to:
- transmit, to the user device, information that identifies at least one of an aggregate exchange total of a medium associated with the exchange or a budget associated with the exchange.

15. The system of claim 9, wherein the operation information identifies at least one of:
- image data associated with performance of a signing operation at the user device, or
- an indication of the performance of the signing operation at the user device.

16. A method, comprising:
- receiving, by a user device and to offload an operation to the user device, presentation information that identifies content for performing the operation at the user device, wherein the operation is associated with an exchange initiated at a terminal device that is configured to perform the operation;
- presenting, at the user device and based on the content, an interface for performing the operation;
- obtaining, by the user device, a user input associated with a performance of the operation at the user device; and
- transmitting, by the user device, operation information associated with the performance of the operation at the user device.

17. The method of claim 16, wherein the operation is not performed by the terminal device based on offloading the operation to the user device.

18. The method of claim 16, wherein the interface is for entering a signature of a user of the user device.

19. The method of claim 16, wherein the presentation information is based on:
- exchange information, associated with the exchange, that identifies a payment medium used in the exchange, and
- user information associated with the payment medium that identifies the user device as being associated with the payment medium.

20. The method of claim 16, wherein the operation information identifies at least one of:
- image data associated with performance of a signing operation at the user device, or
- an indication of the performance of the signing operation at the user device.

* * * * *